(12) United States Patent
Anderson et al.

(10) Patent No.: US 7,298,677 B2
(45) Date of Patent: Nov. 20, 2007

(54) OPTICAL DISC DRIVE APPARATUS AND METHOD

(75) Inventors: Daryl E. Anderson, Corvallis, OR (US); Andrew L. Van Brocklin, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 527 days.

(21) Appl. No.: 10/900,924

(22) Filed: Jul. 28, 2004

(65) Prior Publication Data

US 2006/0023593 A1 Feb. 2, 2006

(51) Int. Cl.
*G11B 7/00* (2006.01)
(52) U.S. Cl. .................................... 369/47.36
(58) Field of Classification Search ............. 369/44.27, 369/44.28, 44.12, 44.14, 44.15, 120, 121, 369/122, 116, 53.3, 47.36
See application file for complete search history.

(56) References Cited

U.S. PATENT DOCUMENTS 6,157,599 A * 12/2000 Yamashita et al. ....... 369/44.28

FOREIGN PATENT DOCUMENTS

| EP | 0299335 A1 | 1/1989 |
|---|---|---|
| JP | 63-217535 A | 9/1988 |
| JP | 6-274912 | 9/1994 |
| JP | 06-274912 A | 9/1994 |
| JP | 7-211025 | 6/1995 |
| JP | 6-7310 | 1/1996 |
| JP | 11-134683 | 6/1999 |
| JP | 2000-090563 A | 3/2000 |

OTHER PUBLICATIONS

European Search Report for European Application No. EP 05014293.4 Report issued Apr. 24, 2007.
Translation of Japan Office Action dated Aug. 29, 2006 for JP Patent Application No. 2005-217315, (4 pgs).

* cited by examiner

*Primary Examiner*—Nabil Hindi

(57) ABSTRACT

An optical disc drive is has a voice coil motor that carries and moves focal optics to focus a laser beam onto an optical disc The voice coil motor is responsive to input signals which are based on a calibrated temperature. A temperature measurement is made at the voice coil motor for an operating temperature, and a difference is calculated between calibrated and operating temperatures. The temperature differences are used to calculate adjustment in input signals used to drive the voice coil motors.

36 Claims, 3 Drawing Sheets

OPTICAL DISC DRIVE APPARATUS AND METHOD

BACKGROUND

Optical discs, such as compact discs (CD) and digital versatile discs (DVD) are forms of computer readable media which provide extensive storage for digital information. One side of an optical disc may contain data and is referred to as a data side. The data side may be read only, or may also be written to. The other side of the optical disc that does not contain data may provide for a label and is referred to as the label side. In particular cases, a side or both sides may provide for both data and a label.

An optical disc drive (ODD) of a computer may be used to read from and may write to a data side of an optical disc. An optical pickup unit (OPU), included within the optical disc drive, is configured with a laser and sensors adapted for reading, and possibly writing, data. Various ODDs and OPUs are available, and are manufactured to specifically read and write to the data side of optical discs.

Using emerging technology, the OPU assembly may be used to produce an image on the label surface of an optical disc configured for such a labeling process. Producing the image includes defining tacks which are concentric circles of the optical disc where the image is written, and focusing focal optics of a laser beam that performs the actual printing of the image on the optical disc.

An ODD typically includes a voice coil motor (VCM) configured as a sled motor that moves an OPU assembly in a radial direction to a position that is adjacent particular tracks of the optical disc. An OPU assembly may also include a VCM configured as a focus motor that moves focal optics to a particular distance orthogonal to a surface of the disc such as a height above or below the disc, to focus a laser beam for labeling. The VCMs are responsive to an input signal (voltage or current) and move to a particular location when a particular input signal is applied. Therefore, when an input signal is applied to the sled VCM, the OPU assembly is moved adjacent to a particular track. Likewise, when an input signal is applied to the focus VCM, the focal optics are moved to a particular focus position. The VCMs are typically calibrated to move a particular distance when a particular input signal is applied. The calibration is performed at a particular temperature.

However, a VCM includes metal windings whose electrical conductivity is affected by temperature changes. Therefore when the VCM is heated, the resistance of the metal windings goes up and electrical conductivity increases. Since a VCM is calibrated at a particular temperature to move a particular distance based on a particular input signal, not accounting for temperature changes can result in inaccurate positioning. For example, if a VCM is operated at a temperature different from the calibration temperature, a particular input signal may move the OPU assembly to an incorrect track position or the focal optics to an incorrect focus position.

Accordingly, a need exists for the present invention.

SUMMARY

An optical disc drive is has a voice coil motor that carries and moves focal optics to focus a laser beam onto an optical disc. The voice coil motor is responsive to input signals which are based on a calibrated temperature. A temperature measurement is made at the voice coil motor for an operating temperature, and a difference is calculated between calibrated and operating temperatures. The temperature differences are used to calculate adjustment in input signals used to drive the voice coil motors.

BRIEF DESCRIPTION OF THE DRAWINGS

The following detailed description refers to the accompanying figures. In the figures, the left-most digit(s) of a reference number identifies the figure (FIG.) in which the reference number first appears. Moreover, the same reference numbers are used throughout the drawings to reference like features and components.

DETAILED DESCRIPTION

Overview

The following discussion is directed to systems and methods for measuring and compensating for temperature variances of voice coil motors (VCM) that carry OPU assemblies and focal optics used in creating and labeling an optical disc.

Exemplary System Environment

Figure 1:
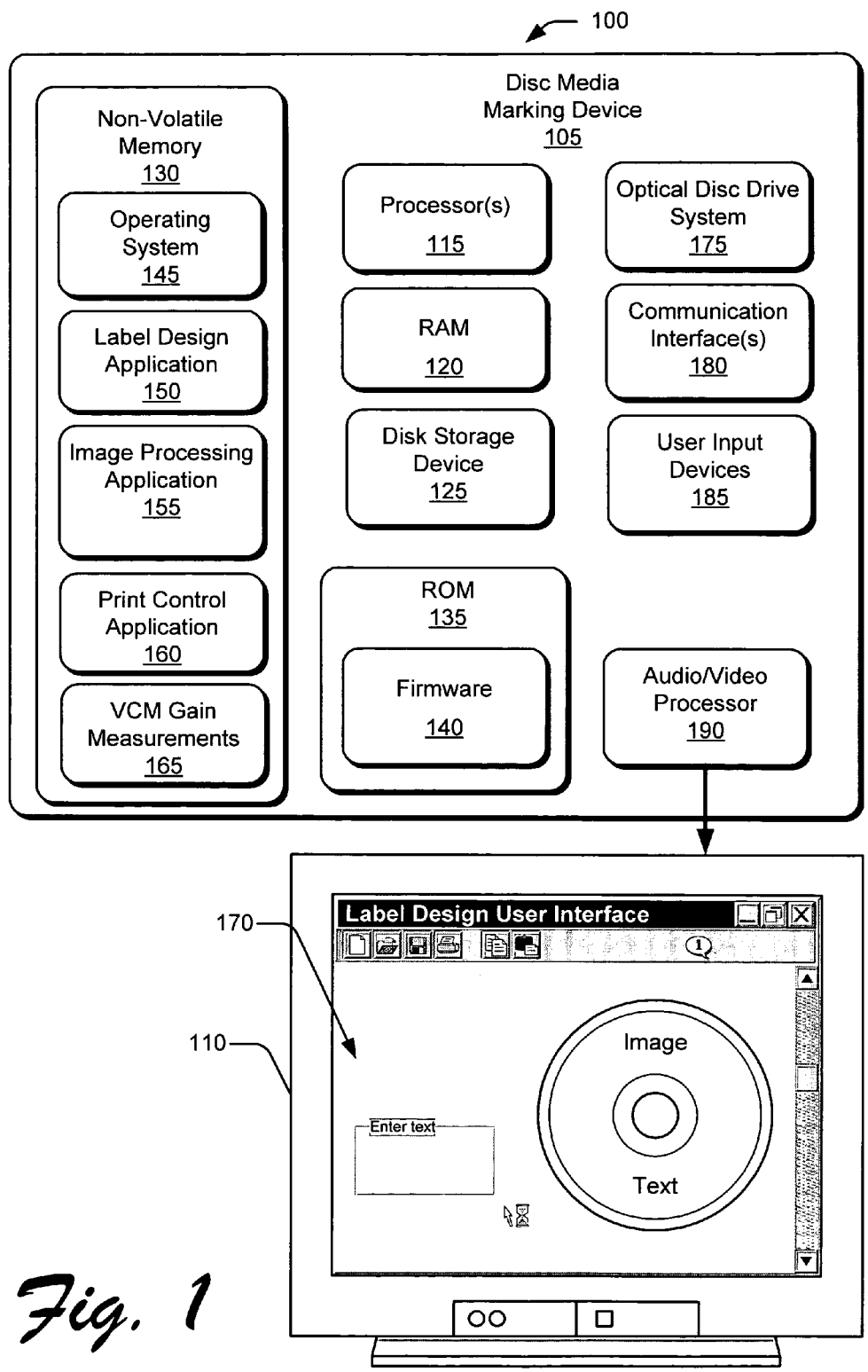
FIG. 1 is a block diagram illustrating an exemplary disc media marking system for measuring and adjusting input signal values to control voice coil motors for operation of tracking and focal optics over varying temperatures, according to an embodiment of the present invention.

FIG. 1 shows an exemplary disc media marking system 100 suitable for measuring and calibrating input voltage values of a voice coil motor. The marking system 100 includes a disc media marking device 105 and a display device 110. The disc media marking device 105 may be implemented as a stand-alone appliance device for labeling disc media. Alternatively, the disc media marking device 105 may be integrated as part of an optical media player or drive, such as a writable compact disc (CD) player or drive which is implemented to label an optical disc as well as record data onto a CD-R (CD recordable disc) and/or a CD-RW (CD-rewritable disc). The disc media marking device 105 may also be integrated as part of a digital versatile disc (DVD) player or drive which is implemented to label an optical disc as well as record data ont a DVD-R, DVD+R, DVD-RW, DVD+RW disc or the like. An optical media player or drive (optical devices) may be used to read from and may write to a data side of an optical disc. An optical pickup unit (OPU), included within the optical device, is configured with a laser and sensors adapted for reading and writing data. Such writable optical devices may include, for example, a standalone audio CD player which is a peripheral component in an audio system, a CD or DVD drive integrated as standard equipment in a PC (personal computer), a DVD (digital versatile disc) player and/or recorder, and any number of similar embodiments.

Disc media marking device 105 typically includes one or more processors 115 (e.g., any of microprocessors, controllers, and the like) which process various instructions to control the operation of disc media marking device 105 and communicate with other electronic and computing devices. Disc media marking device 105 may be implemented with one or more memory components, examples of which include a random access memory (RAM) 120, a disc storage device 125, and nonvolatile memory 130 (e.g., any one or more of a read-only memory (ROM) 135, flash memory, EPROM, EEPROM, etc.).

Disc storage device 125 may include any type of magnetic or optical storage device, such as a hard disc drive, a magnetic tape, a recordable and/or rewriteable compact disc (CD), a DVD, DVD+RW, and the like. The one or more memory components provide data storage mechanisms to store various information and/or data such as configuration information for disc media marking device 105, graphical user interface information, and any other types of information and data related to operational aspects of disc media marking device 105. Alternative implementations of disc media marking device 105 may include a range of processing and memory capabilities, and may include any number of differing memory components than those shown in FIG. 1.

Disc media marking device 105 may include a firmware component 140 which is implemented as a permanent memory module stored on ROM 135, or with other components in disc media marking device 105, such as a component of a processor 115. Firmware 140 is programmed and distributed with disc media marking device 105 to coordinate operations of the hardware within disc media marking device 105 and contains programming constructs used to perform such operations.

An operating system 145 and one or more application programs may be stored in nonvolatile memory 130 and executed on processor(s) 115 to provide a runtime environment. A runtime environment facilitates extensibility of disc media marking device 105 by allowing various interfaces to be defined that, in turn, allow the application programs to interact with disc media marking device 105. In this example, the application programs include a label design application 150, an image processing application 155, and a print control application 160. Furthermore, it is contemplated that VCM gain measurements 165 are stored in nonvolatile memory such as non-volatile memory 130. In certain embodiments, VCM gain measurements 165 are stored in nonvolatile sections of RAM 130 or ROM 135. VCM gain measurements are inherent to the particular VCM, and specifically related to the metal used in the VCM windings and the number of windings of the VCM and the temperature at which the measurement was made An example of a VCM gain measurement for a copper VCM is 0.426 mm/V at 36 degrees centigrade.

The label design application 150 generates a label design user interface 170 for display on display device 110 from which a user may create a label image to be rendered on a disc media, such as on an optical disc. A user may specify text, a bitmap image for background, a digital photo, a graphic or symbol, and/or any combination thereof to create the label image on the user interface 170.

The image processing application 155 processes the label image created with the label design user interface 170 to produce a data stream of label image data and laser control data for labeling the image on concentric circular tracks of a disc media (i.e., an optical disc). For example, a continuous tone RGB (red, green, and blue) rectangular raster graphic of the label image may be color mapped and separated into the printing color channels KCMY (black, cyan, magenta, and yellow), or grayscale and then halftoned and converted to concentric circular tracks. This data stream may be formatted as laser control data, and may be augmented with other control commands to control the disc media marking device 105 rendering a label on the disc media.

A label file using image processing application 155 may be generated. The label file is communicated to a controller 260 (FIG. 2) by print control application 160 which parses the label file to control a labeling mechanism. Alternatively, the concentric circular tracks may be generated and streamed to the disc media marking device 105 one track at a time for processing and labelling, through print control application 160.

The print control application 160 determines the radius from the hub of the disc of the first track and the subsequent track spacing. After the radius of the first track and the track spacing are determined, the print control application 160 determines which label image data will correspond to each respective track. The laser mark locations along a particular track are specified in a coordinate system where the concentric circular tracks are defined in coordinates of the radial distance and the distance along each respective track.

Disc media marking device 105 includes an optical disc drive (ODD) system 175 which may be configured to produce visible marks on a surface of a disc media (i.e., optical disc), so as to produce a label image on a label surface (i.e., label side) of the optical disc. The ODD system 175 is described in greater detail herein below with reference to FIG. 2.

Disc media marking device 105 may further include one or more communication interfaces 180 which may be implemented as any one or more of a serial and/or parallel interface, as a wireless interface, any type of network interface, and as any other type of communication interface. A wireless interface enables disc media marking device 105 to receive control input commands and other information from an input device, such as from a remote control device or from another infrared (IR), 802.11, Bluetooth, or similar RF input device. A network interface provides a connection between disc media marking device 105 and a data communication network which allows other electronic and computing devices coupled to a common data communication network to send label image data and other information to disc media marking device 105 via the network. Similarly, a serial and/or parallel interface provides a data communication path directly between disc media marking device 105 and another electronic or computing device.

Disc media marking device 105 may include user input devices 185 which may include a keyboard, pointing device, selectable controls on a user control panel, and/or other mechanisms to interact with, and to input information to disc media marking device 105. Disc media marking device 105 also includes an audio/video processor 190 which generates display content for display on display device 110, and generates audio content for presentation by a presentation device, such as one or more speakers (not shown). The audio/video processor 190 may include a display controller which processes the display content to display corresponding images on display device 110. A display controller may be implemented as a graphics processor, microcontroller, integrated circuit, and/or similar video processing component to process the images. Video signals and audio signals may be communicated from disc media marking device 105 to display device 110 via an RF (radio frequency) link, S-video link, composite video link, component video link, or other similar communication link.

Although shown separately, some of the components of disc media marking device 105 may be implemented in an application specific integrated circuit (ASIC). Additionally, a system bus (not shown) typically connects the various components within disc media marking device 105. A system bus may be implemented as one or more of any of several types of bus structures, including a memory bus or memory controller, a peripheral bus, an accelerated graphics port, or a local bus using any of a variety of bus architectures. Furthermore, disc media marking device 105 may share a system bus with a host processor.

Exemplary ODD Embodiment

Figure 2:
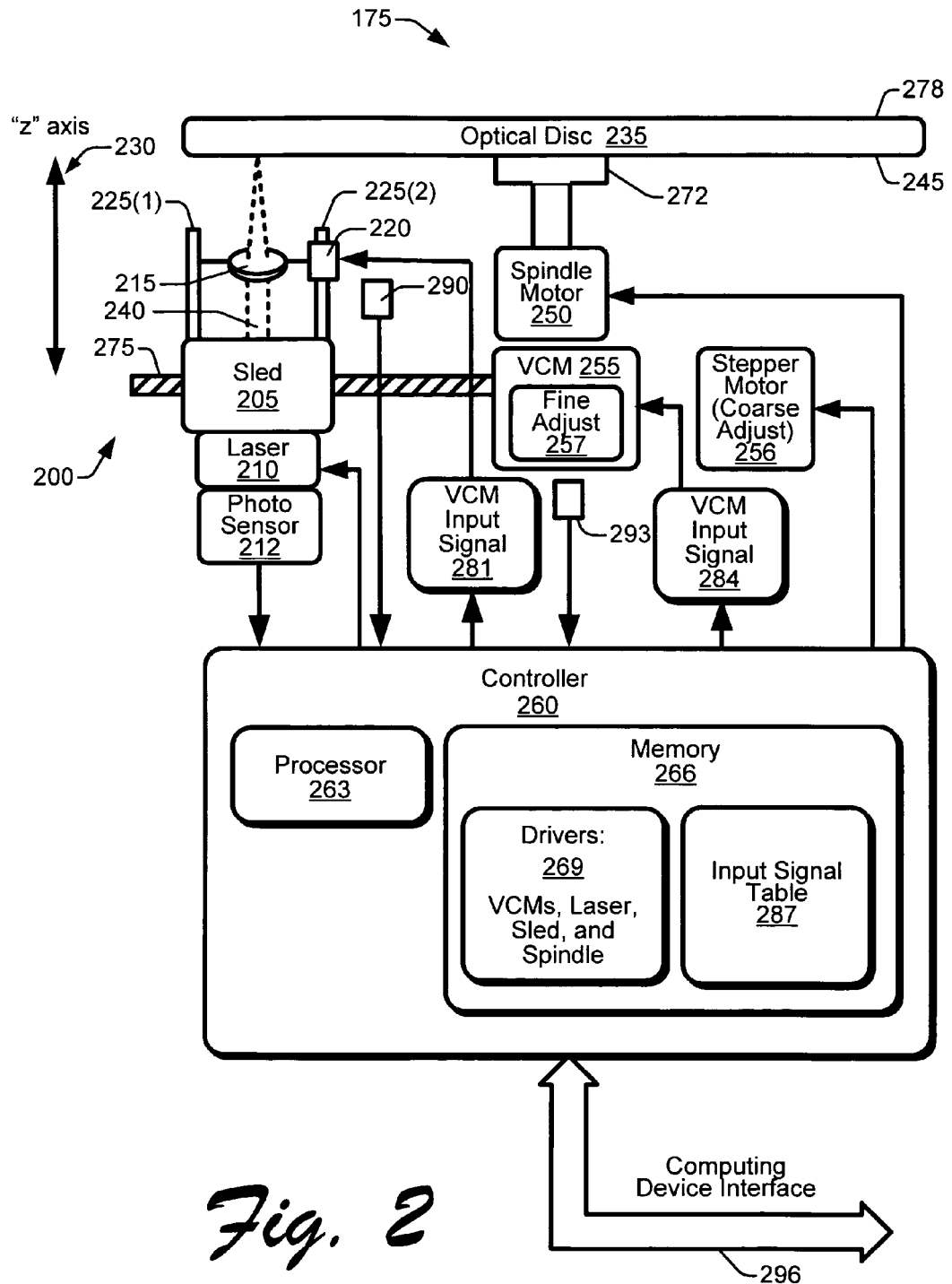
FIG. 2 is a block diagram illustrating an exemplary optical disc drive system used for mapping and labeling according to an embodiment of the present invention.

FIG. 2 shows an exemplary embodiment of the ODD system 175 shown in FIG. 1. The ODD system 175 includes an optical pickup unit (OPU) assembly 200 that includes a sled 205, a laser 210, a photo sensor 212, focal optics 215 and a voice coil motor (VCM) 220. The VCM 220 responds to an input signal (voltage or current) to cause the focal optics 215 to move the focal point of a laser beam generated by laser 210.

For purposes of illustration, the focal optics 215 are carried by lens supports 225(1), 225(2). The focal optics 215 are configured for travel (i.e. adjustment of the focal point) along a "z" axis 230 perpendicular to a surface of an optical disc 235. Photo sensor 212 determines a distance along "z" axis 230 at which an "in focus" condition of the laser beam exists with respect to a particular location on the surface of optical disc 235. VCM 220 is calibrated to move to this particular distance by receiving a particular input signal. However, if the operating temperature when labeling is performed is different from the temperature at which the VCM was calibrated, the laser beam may be out of focus since a different z-axis position value results from the unadjusted input signal. Therefore as discussed below, an adjustment is made to compensate for the change in temperature in order to determine the proper input signal needed to arrive at the desired z-axis position corresponding to the "in focus" position.

However, in some embodiments it may be desirable to further adjust the z-axis position so as to intentionally defocus the laser beam. This focus offset may be provided in order to provide a better image quality using a marking laser. For example, the size of the visible spots created by a focused laser may be too small to allow efficient labeling, so a defocused laser beam may be used to created larger visible spots. Or the marking laser may create such distortion from its heat when marking a surface, as to provide a need for an adjusted focus offset. A predetermined amount of focus offset may be achieved by providing a corresponding focus offset value for the input signal. This offset value is also typically determined at the calibration temperature of the VCM. Therefore, variances in actual operating temperature may also provide a need to adjust the focus offset value based on the temperature variance.

A laser beam 240 is generated by the laser 210 and directed onto (reflected on) a label side surface 245 of optical disc 235. The laser beam 240 creates laser marks that correspond to label image data to produce an image of the label side 245 of the optical disc 235.

The ODD system 175 includes a spindle motor 250, a VCM 255, and a controller 260. VCM 255 acts as a sled motor that moves OPU assembly 200 adjacent to particular radial positions or tracks of optical disc 235. VCM 255 is calibrated to move to this particular distance by receiving a particular input signal. VCM 255 may be referred to as a sled or radial VCM since it provides movement in the radial direction. VCM 255 may be calibrated for gain—in other words input signal (e.g., millivolts) per movement (microns), such that for example, a particular number of millivolts results in a movement in distance.

A separate stepper motor 256 provides a coarse adjustment for radial movement, and particularly is calibrated to move per a step size increment as instructed by controller 260. VCM 255 includes a fine adjust feature 257. While stepper motor 256 is calibrated to move per a step size increment, fine adjust feature 257 is calibrated to adjust to a finer increment. For example, if stepper motor 256 is calibrated for a step size of 120 microns, and fine adjust feature 256 is calibrated for a smaller increment, when 80 microns of movement is requested, stepper motor 256 moves the sled 205 by 120 microns, and fine adjust feature 257 moves the sled 205 back by 40 microns.

The gain or movement of VCM 255 (i.e., fine adjust feature 256) is affected by temperature changes The gain of VCM 255 is calibrated at a particular operating temperature (i.e., a predetermined operating temperature gain); however variances in actual operating affect the actual gain of VCM.

In general, controller 260 may be implemented as a printed circuit board employing a combination of various components discussed above with respect to the disc media marking system 100 of FIG. 1. Accordingly, controller 260 typically includes a processor 263 for processing computer/processor-executable instructions from various components stored in a memory 266. Processor 263 is typically one or more of the processors 115 discussed above with respect to the disc media marking system 100 of FIG. 1. Likewise, memory 266 is typically the non-volatile memory 130 and/or firmware 140 of disc media marking system 100 of FIG. 1.

Drivers 269, including a laser driver, sled driver, and spindle driver are stored in memory 266 and executable on processor 263. Although these components are represented in the FIG. 2 embodiment as software components stored in memory 266 and executable on processor 263, they may also be implemented as firmware or hardware components.

In general, a spindle driver drives the spindle motor 250 to control a rotational speed of optical disc 235 via a spindle 272. The spindle driver operates in conjunction with a sled diver which drives the VCM 255 to control radial (track) positioning of OPU assembly 200 with respect to disc 235 along a sled drive mechanism 275. In a labeling implementation the sled 205 of the OPU assembly 200 is moved along the sled drive mechanism 275 to various radii (track) positions of optical disc 235.

In a labeling implementation, the rotational speed of disc 235 and the radial position of OPU assembly 200 are controlled such that laser marks are written at desired positions on the disc 235 as the label side surface 245 moves past the laser beam 240.

A laser driver controls the activation and intensity of laser beam 240 to write laser marks corresponding to a label image onto the label side surface 245. Additionally, the laser driver controls the activation and intensity of the laser beam 240 to read data maintained on the data side 278 of the optical disc 235 when the disc is positioned such that the data side 278 passes over the laser beam 240. In certain cases, the same side is used for data and labeling.

A driver for VCM 220 is included among the drivers 269. The VCM driver is executable on processor 263 to adjust a VCM input signal source 281 which provides an input to VCM 220. Furthermore, another driver is included for VCM 255 executable on processor 263 to adjust a VCM input signal source 284 which provides an input to VCM 255. Input signals may be either current or voltage. As discussed, VCMs 220 and 255 are calibrated at a particular operating temperature, therefore input signals are based on the particular calibrated operating temperature. However, when the OPU assembly is operated at temperatures other than the calibrated operating temperature may result in different distances from the VCMs 220 and 255.

Operating temperatures are read from temperature sensing apparatuses 290 and 293. In this exemplary implementation two temperature sensing apparatuses are provided, temperature sensing apparatus 290 for VCM 220 and temperature sensing apparatus 293 for VCM 255 to measure operating temperatures at the respective VCMs. In other implementations, a single temperature sensing apparatus may be used to determine general operating temperatures for the VCMs. For better accuracy separate temperature sensing apparatuses are placed at the windings of VCM 220 and VCM 255 respectively. Operating temperature measurements are passed to the controller 260 and may be stored in memory 266

Computing device interface 296 interfaces the controller 260 of the ODD system 175 with another electronic or computing device to receive label image data or a label file (not shown). The computing device interface 296 can be implemented as an ATAPI (Advanced Technology Attachment Packet Interface), which is one of many small computer parallel or serial device interfaces. Another common computer interface is SCSI (small computer system interface), which is a generalized device interface for attaching peripheral devices to computers. SCSI defines the structure of commands, the way commands are executed, and the way status is processed. Various other physical interfaces include the Parallel Interface, Fiber Channel, IEEE 1394, USB (Universal Serial Bus), and ATA/ATAPI. ATAPI is a command execution protocol for use on an ATA interface so that CD-ROM and tape drives can be connected via the same ATA cable with an ATA hard disc drive. ATAPI devices generally include CD-ROM drives, CD-recordable drives, CD-rewritable drives, DVD (digital versatile disc) drives, tape drives, super floppy drives (e.g., ZIP and LS-120), and the like.

Controller 260 or processors 263 may perform the following calculations. Non-temperature compensated input signal values are provided to VCMs 220 and 255. Actual operating temperature is measured and the input signals from VCM input signals 281 and 284 are adjusted accordingly in order to arrive at a correctly position the focal optics 215 and sled 205

Operating temperature measurements are made by temperature sensing apparatuses 290 and 293. Preferably, temperature sensing apparatus 290 is placed in close proximity to the windings of VCM 220 and temperature sensing apparatus 293 is place in close proximity to the windings of VCM 255. In other embodiments, a single temperature sensing apparatus is used for VCM 220 and VCM 255.

A calculation is made as to the effect on the required input signal due to the difference between a calibration temperature at which VCM 220 or VCM 255 was previously calibrated, and the current operating temperature measured by the corresponding temperature sensing apparatus 290 or 293. The calibration temperature may be store in a nonvolatile section of memory 266 and recalled by controller 266 or processors 263. Therefore two delta temperature values are calculated for VCMs 220 and VCM 255. The following equation describes each delta temperature value, where Operating$_{temp}$ is the measured operating temperature and Calibrated$_{temp}$ is the temperature at which the VCM was calibrated.

$$\Delta_{temp}(VCM) = Operating_{temp} - Calibrated_{temp}$$

Each delta temperature value is multiplied by the temperature coefficient (TC) of the respective VCMs 220 and 255. The resultant value is the voltage adjustment needed for the input signal value. Note that, in one embodiment, the TC may be predominantly based on the value of the thermal coefficient of resistance (TCR) of the metal used for the windings of the VCMs. To more accurately gauge thermal effects, however, the TC (temperature coefficient) of the entire system (or VCM), which includes more than just the winding metal TCR, is generally considered. To account for such thermal effects, the TC of the VCM may be determined by design and manufacturing, which typically results in a nominal TC for the system, and minimum and maximum limits for the TC of the system.

An example of a metal used in a winding for VCM 220 and 255 is copper. The TCR of copper is 0.393% per degree centigrade The following equation is calculated to derive an input signal adjustment, in this example a voltage input adjustment.

$$Adjustment = \Delta_{temp}(VCM) * (TC)$$

Each input value in the input signal table 287 is adjusted by the derived value of "Adjustment". The following equation describes the readjustment, where "Adjusted Voltage" is the readjusted input signal value and "Input Voltage" is a input signal value of input signal table 287.

$$Adjusted\ Voltage = Input\ Voltage + Adjustment * Input\ Voltage$$

An example is the following. Calibration temperature=36 degrees centigrade; measured operating temperature is 55 degrees centigrade; and TC is 0.393% per degree centigrade.

$$Adjustment = (55-36)*(0.393) = 7.5\%$$

Therefore if an input signal value or voltage value is 70 mV, it is adjusted by $_+$7.5% to arrive at a temperature compensated value of 75.25 mV. This is the voltage applied to the voice coil motor to position the objective lens or the sled.

With regard to the focus VCM 220, a focus offset value may be included in the input signal adjustment For example, if a 30 micron (um) focus offset is desired, an example VCM gain measurement at the calibrated temperature of 36 degrees centigrade is 0.426 mm/V. Therefore to account for this focus offset an additional voltage (input) value is added to the input signal value. In this example, the derived additional voltage is 0.030 mm/(0.426 mm/V)=70.42 mV. However, a temperature compensated additional voltage value where the operating temperature is 55 degrees centigrade is (0.030 mm/0.426 mm/V)(100%+7.50%)=75.70 mV. To achieve the same focus offset at the operating temperature 75.70 mV is added, instead of 70.42 mV.

Figure 3:
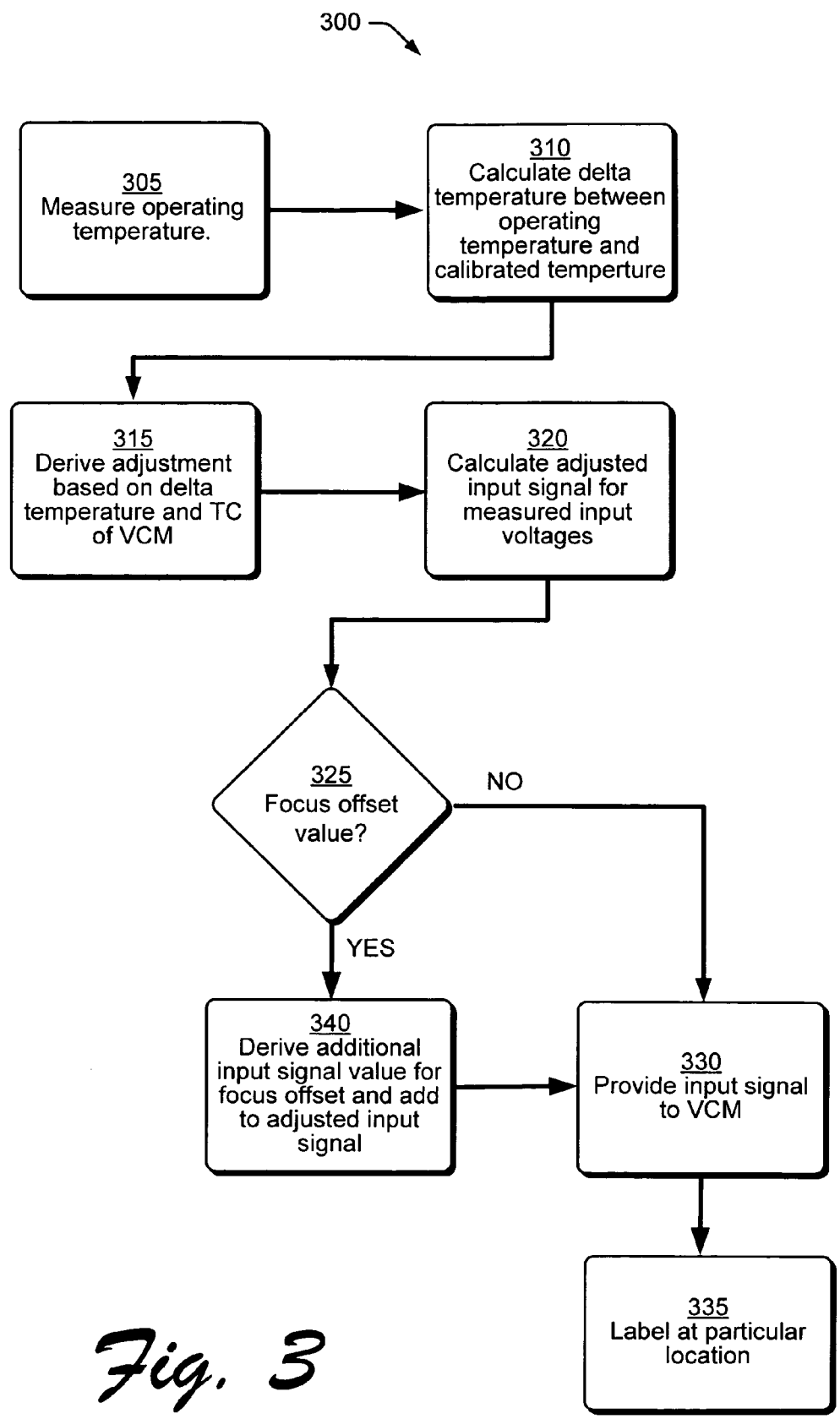
FIG. 3 is a flow chart illustrating a temperature adjustment and labeling procedure, according to an embodiment of the present invention.

FIG. 3 shows an exemplary process 300 to label a label region of an optical disc. Exemplary process 300 may be included in ODD 175 of FIG. 1 and FIG. 2. Furthermore, ODD 175 may be implemented with mechanisms and functions for performing process 300.

At block 305 a temperature measurement is made at a VCM or VCMs such as VCMs 220 and 255 of FIG. 2. The temperature measurement is made with a device such as temperature sensing apparatuses 290 and 293 of FIG. 2.

At block 310 a calculation is made as to the difference of the temperature used for calibration and the measured operating temperature from block 305. This calculation may be performed for selected VCMs or all VCM.

At block 315 a calculation is made as to an adjustment factor where the calculation is the product of the difference of temperature and thermal coefficient (TC) of the particular VCM.

At block 320 a calculation is made to determine an adjusted input signal value based on the adjustment factor derived at block 315. The adjusted input signal value is based on an input signal value derived from process 300 either reduced or increased by the adjustment factor derived at block 315.

At block 325 a decision is made whether a focus offset value is to be determined. A focus offset value may be determined for the VCM that carries the focal optics. If focus offset calculation is not to be performed (i.e., following the "NO" branch of block 325), block 330 is performed. At block 330 the adjusted input signal value is sent to an input signal source, such as VCM input signal sources 281 and 284 in order to generate the input signal for the corresponding VCM to place the sled 205 adjacent a desired track, or to place focal optics 215 at a desired focal position At block 335 after the VCMs receive the adjusted input signal and place the OPU assembly and focal optics in place, labeling may be performed on the particular location.

If a focus offset value calculation is to be performed (i.e., following the "YES" branch of block 325), block 340 is performed. At block 340 an adjusted input signal to achieve a desired amount of focus offset is calculated. The input signal is derived by dividing the focus offset distance by the VCM gain and multiplying by the temperature difference calculated in block 310. This calculation is performed for the VCM that carries the focal optics.

The focus offset value calculated in block 340 is added to the adjusted input signal that places the focal optics in proper focus. This combined input signal value is sent to an input signal source such VCM input signal sources 281 in order to drive the VCM to place the focal optics in proper focus.

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

The invention claimed is:

1. An optical disc drive comprising:
a voice coil motor (VCM) carrying focal optics to focus a laser beam onto an optical disc, the VCM responsive to an input signal;
a temperature sensing apparatus placed at windings of the VCM that measures an operating temperature at the VCM; and
a controller configured to adjust the input signal when a difference exists between the operating temperature and a calibration temperature of the VCM.

2. The optical disc drive of claim 1 wherein the input signal is a voltage signal.

3. The optical disc drive of claim 1 wherein the input signal is a current signal.

4. The optical disc drive of claim 1 wherein the VCM is calibrated for a predetermined focus offset.

5. The optical disc drive of claim 1 wherein the adjusted input signal is further adjusted for a predetermined focus offset.

6. The optical disc drive of claim 1 wherein the temperature sensing apparatus comprises a first temperature sensing apparatus and a second temperature sensing apparatus placed at windings of the VCM.

7. The optical disc drive of claim 1 wherein the VCM has copper windings.

8. An optical disc drive comprising:
a voice coil motor VCM) that moves a sled that carries focal optics, wherein the sled provides radial positioning of the focal optics to focus a laser beam onto an optical disc, the VCM responsive to an input signal;
a temperature sensing apparatus placed at windings of the VCM that measures an operating temperature at the VCM; and
a controller configured to adjust the input signal when a difference exists between the operating temperature and a calibration temperature of the VCM.

9. The optical disc drive of claim 8 wherein the VCM includes a course adjustment feature and a course adjustment feature.

10. The optical disc drive of claim 9 wherein the course adjustment feature moves the sled over a predetermined increment and the fine adjustment feature adjusts per a lower predetermined increment based for a distance corresponding to the input signal.

11. The optical disc drive of claim 8 wherein the input signal is a voltage signal.

12. The optical disc drive of claim 8 wherein the input signal is a current signal.

13. A method comprising:
measuring operating temperatures at a first VCM and a second VCM;
determining temperature differences between the operating temperatures and calibration temperatures of the first VCM and the second VCM; and
adjusting input signals to the first VCM and the second VCM based on the temperature differences.

14. The method of claim 13 wherein the measuring comprises separate measurements of the first VCM and the second VCM.

15. The method of claim 13 wherein the adjusting is based on a thermal contact resistance values of metals used for the first VCM and the second VCM.

16. The method of claim 13 wherein the adjusting further comprises accounting for an adjusted focus offset input signal for the second VCM.

17. The method of claim 16 wherein the adjusted focus offset input signal is based on a VCM gain measurement of the second VCM.

18. The method of claim 13 further comprising labeling at the locations based on the first and second VCMs receiving adjusted input signals.

19. A processor-readable medium comprising processor-executable instructions for mapping and labeling to an optical disc, the processorexecutable instructions comprising instructions for:
measuring temperatures at the first VCM and the second VCM; and
adjusting input signals to the first VCM and second VCM based on a difference between measured temperatures and calibration temperatures used to relate VCM movement to input signal.

20. The processor-readable medium of claim 19 wherein the adjusting further comprises calculating a focus offset value based on temperature difference of the second VCM and gain measurement of the second VCM.

21. The processor-readable medium of claim 19 further comprising labeling using the adjusted input signals to drive the first VCM to place the OPU at a proper track and to drive the second VCM to place the focal optics in proper focus.

22. An ODD comprising:
means for determining operating temperatures at a first VCM and a second VCM;
means for calculating differences between the operating temperatures and calibration temperatures for the VCMs; and
means for adjusting input voltages to the VCMs to account for the differences when labeling an optical disc.

23. The ODD of claim 22 wherein the means for adjusting further comprises adjusting the input signals to the second VCM based on a temperature dependent focus offset value.

24. An optical disc drive comprising:
a voice coil motor (VCM) coupled to an optical pickup unit (OPU);
a predetermined input signal for the VCM that is configured to position the OPU at a predetermined location relative to an optical disc when the VCM is at a calibration temperature;
a temperature sensing apparatus placed at windings of the VCM that measures an operating temperature at the VCM; and
a controller configured to adjust the input signal to form a temperature compensated input signal based on a difference between the operating temperature and the calibration temperature, and to apply the temperature compensated input signal to the VCM so as to position the OPU at the predetermined location when the VCM is at the operating temperature.

25. The method of claim 18, wherein the VCM controls an elevation of an OPU above a surface of a disc.

26. The method of claim 18, wherein the VCM controls a radial position of an OPU from a center of a disc.

27. An optical disc drive comprising:
a focus voice coil motor (VCM) responsive to a first input signal and adapted to focus a laser relative to a disc;
a radial VCM responsive to a second input signal and adapted to radially position the laser relative to the disc;
a first temperature sensing apparatus that measures a first operating temperature at windings of the focus VCM;
a second temperature sensing apparatus that measures a second operating temperature at windings of the radial VCM; and
a controller that adjusts the first input signal based on a difference between the first operating temperature and a calibration temperature of the focus VCM, and the second input signal based on a difference between the second operating temperature and a calibration temperature of the radial VCM.

28. The optical disc drive of claim 24 wherein the voice coil motor is a plurality of voice coil motors, and wherein the temperature sensing apparatus is a plurality of temperature sensing apparatuses each placed at the windings of a corresponding one of the plurality of voice coil motors.

29. An optical disc drive comprising:
a temperature sensing arrangement configured to measure operating temperatures at a first VCM and a second VCM; and
a processor configured to
determine temperature differences between the operating temperatures and calibration temperatures of the first VCM and the second VCM, and
adjust input signals to the first VCM and the second VCM based on the temperature differences.

30. The optical disc drive of claim 29 wherein the first VCM is a focusing VCM that controls an elevation of an OPU above a surface of an optical disc in the drive, and the second VCM is a tracking VCM that controls a radial position of an OPU from a center of the optical disc.

31. The method of claim 13 wherein the adjusting includes calculating a percentage adjustment in each of the input signals by multiplying the temperature difference of the corresponding VCM by a temperature coefficient of the corresponding VCM.

32. The optical disc drive of claim 29 wherein the processor adjusts the input signals by calculating a percentage adjustment in each of the input signals, each percentage adjustment derived by multiplying the temperature difference of the corresponding VCM by a temperature coefficient of the corresponding VCM.

33. The optical disc drive of claim 8 wherein the controller is configured to further adjust the input signal for a predetermined focus offset so as to defocus the laser beam.

34. The optical disc drive of claim 33 wherein the predetermined focus offset produces larger visible spots on the optical disc.

35. The optical disc drive of claim 30 wherein the processor is further configured to adjust the input signal to the first VCM so as to achieve a predetermined focus offset distance in the elevation of the OPU so as to defocus a laser beam emitted from the OPU onto the surface of the optical disc.

36. The optical disc drive of claim 27 wherein the controller is configured to further adjust the first input signal based on the difference between the first operating temperature and the calibration temperature of the focus VCM so as to defocus the laser relative to the disc by a predetermined focus offset distance.

* * * * *

UNITED STATES PATENT AND TRADEMARK OFFICE
CERTIFICATE OF CORRECTION

PATENT NO. : 7,298,677 B2  Page 1 of 1
APPLICATION NO. : 10/900924
DATED : November 20, 2007
INVENTOR(S) : Daryl E. Anderson et al.

It is certified that error appears in the above-identified patent and that said Letters Patent is hereby corrected as shown below:

On the Title page, in field (56), under "Foreign Patent Documents", in column 2, line 5, delete "6/1995" and insert -- 8/1995 --, therefor.

On the Title page, in field (56), under "Foreign Patent Documents", in column 2, line 6, delete "6-7310" and insert -- 8-7310 --, therefor.

On the Title page, in field (57), under "Abstract", in column 2, line 1, after "drive" delete "is".

On the Title page, in field (57), under "Abstract", in column 2, line 3, after "disc" insert -- . --.

In column 10, line 6, in Claim 8, delete "VCM)" and insert -- (VCM) --, therefor.

In column 10, line 54, in Claim 19, delete "processorexecutable" and insert -- processor-executable --, therefor.

Signed and Sealed this

Twelfth Day of August, 2008

JON W. DUDAS
*Director of the United States Patent and Trademark Office*